Feb. 4, 1941.  G. S. VAN ANTWERP  2,230,734
GUARD MOLDING FOR CONDUCTORS ON WOODEN POLES
Filed Aug. 25, 1938

WITNESS:
Rob't R. Kitchel

INVENTOR
George S. Van Antwerp
BY
Augustus B. Stoughton
ATTORNEY.

Patented Feb. 4, 1941

2,230,734

UNITED STATES PATENT OFFICE 2,230,734

GUARD MOLDING FOR CONDUCTORS ON WOODEN POLES

George S. Van Antwerp, Norristown, Pa.

Application August 25, 1938, Serial No. 226,759

1 Claim. (Cl. 174—45)

One object of the present invention is to provide a comparatively inexpensive, mechanically strong, and electrical insulating molding for guarding and supporting an insulated or bare electrical conductor mounted or suspended in contact with a wooden pole, and which molding is durable and capable of reuse and may be readily applied to and removed from a wooden pole in any desired location in order to cover and uncover a conductor and in order to insulate it by air and to protect it.

Another object of the invention is to provide a molding for the purpose specified which will meet all the definite requirements of services, including resistance to the spurs of climbers and to shocks produced by the collision of automobiles and motor vehicles, and including protection against hazards generally.

Other objects of the invention will appear from the following description at the end of which the invention will be claimed.

Generally stated, the invention consists of a rigid steel strip of hollow or trough shaped steel molding having only marginal flanges provided with openings for fastening devices by means of which it is secured to a wooden pole with a conductor inside the molding, and of an insulating impregnated felt lining arranged in the hollow of the molding and extending at least to the faces of the flanges and spaced from the conductor.

The invention also comprises the improvements to be presently described and finally claimed.

Figure 1:
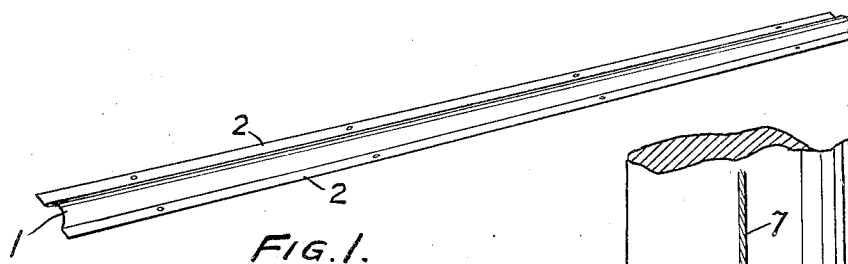

In the following description reference will be made to the accompanying drawing forming part hereof and in which, Figure 1 is a perspective view of molding embodying features of the invention.

Figure 3:
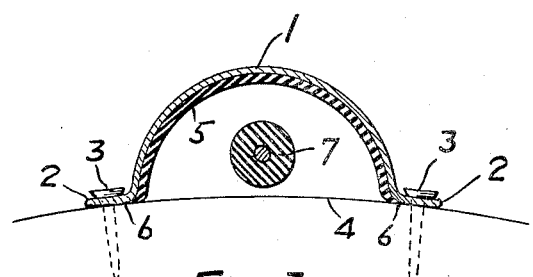
Figure 2:
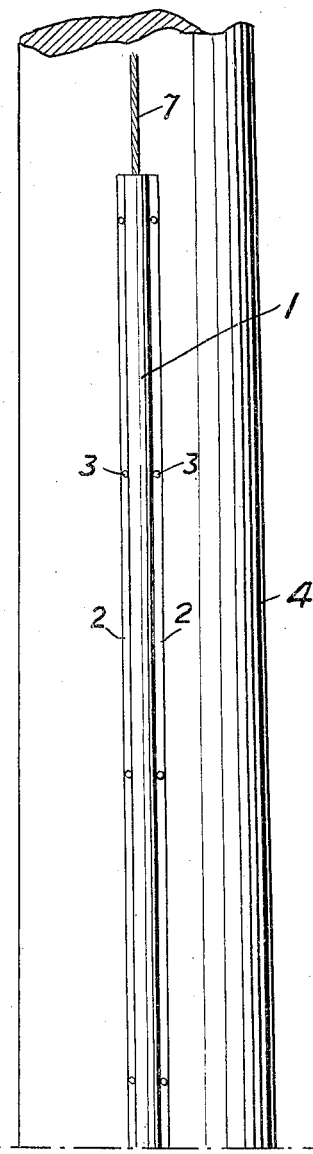

Figure 2 is an elevational view showing the molding in application to a wooden pole and covering a conductor suspended or mounted in contact with the wooden surface of the pole; and Figure 3 is a transverse sectional view drawn to an enlarged scale.

Referring to the drawing, 1 generally indicates a strip of hollow or trough shaped molding of steel or the like. The cross section of the steel molding is such as will impart mechanical strength. The molding is provided with marginal flanges 2 and these flanges are provided with openings for the passage of fastening devices 3 by which it is secured to a wooden pole 4. 5 is a lining secured in the hollow of the molding and it extends at least to the faces 6 of the flanges. The lining may well be made of paper felt impregnated with asphaltum because this insulating material will stand a very high voltage. The fastenings 3 may be of the double headed tack variety because they are convenient in mounting and dismounting the molding on the surface of a wooden fold, such as is employed in electrical distribution systems. 7 is a conductor which may be covered with insulation or bare and which is mounted or suspended at the surface of the wooden pole.

The described molding is possessed of mechanical strength and will resist the spurs of climbers and the shocks of motor vehicles and other objects to which it is exposed so that it affords mechanical protection. The molding may be readily applied and removed and it may be located so as to cover the conductor 7 in all hazardous locations. For example, the molding may be applied at the base of the pole and extended up the pole for the requisite distance or it may be applied at the top of the pole to protect workmen in hazardous locations or in fact it may be applied wherever necessary or desirable. The molding may be grounded by making it in a continuous length, or sections of it may be air insulated by spacing them at their ends. The surface of the insulating lining and the surface of the wooden pole define a space containing air which insulates the conductor 7. The described molding also serves to confine and support the conductor 7, more especially if it should become unfastened or loose at the top.

It will be obvious to those skilled in the art to which the present invention relates that modifications may be made in detail of construction and arrangement in matters of mere form without departing from the spirit of the invention which is not limited in respect to such matters or otherwise than as the prior art and the appended claim may require.

I claim:

The combination comprising, an electrical conductor extending along a wooden pole, and mountable and demountable guarding and insulating means for said conductor, said means consisting of a strip of rigid trough-shaped steel molding having an imperforate concave trough and having marginal flanges extending longitudinally thereof and having perforations in said flanges to accommodate fastening devices by which the molding is secured to the pole with the conductor inside it, and of an insulating impregnated felt lining arranged in the trough of the molding and extending at least to the faces of the flanges and spaced from the conductor, the wooden surface of the pole and the insulating felt lining and the air in the space therebetween providing insulation of the conductor and the inherent strength of the molding mechanically protecting the conductor from impacts of climbing spurs, motor vehicles and other objects.

GEORGE S. VAN ANTWERP.